United States Patent
Zhu et al.

(10) Patent No.: US 10,681,737 B2
(45) Date of Patent: Jun. 9, 2020

(54) RANDOM ACCESS METHOD, TERMINAL, AND BASE STATION

(71) Applicant: Huawei Technologies Co., Ltd., Shenzhen, Guangdong (CN)

(72) Inventors: Song Zhu, Beijing (CN); Guangwei Yu, Beijing (CN); Yiling Wu, Beijing (CN); Weiliang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 15/659,524

(22) Filed: Jul. 25, 2017

(65) Prior Publication Data

US 2017/0325267 A1 Nov. 9, 2017

Related U.S. Application Data

(63) Continuation of application No. PCT/CN2015/071579, filed on Jan. 26, 2015.

(51) Int. Cl.
*H04W 74/08* (2009.01)
*H04W 72/04* (2009.01)

(52) U.S. Cl.
CPC ..... *H04W 74/0833* (2013.01); *H04W 72/042* (2013.01); *H04W 74/08* (2013.01)

(58) Field of Classification Search
CPC ........... H04W 74/0833; H04W 72/042; H04W 74/08
See application file for complete search history.

(56) References Cited

U.S. PATENT DOCUMENTS

2006/0239239 A1 10/2006 Yang
2008/0075043 A1 3/2008 Wang et al.
(Continued)

FOREIGN PATENT DOCUMENTS

CN 101969697 A 2/2011
CN 102158901 A 8/2011
(Continued)

OTHER PUBLICATIONS

Huawei Technologies Co., Ltd. et al., "NB M2M-Random Access Procedure of MAC Layer", 3GPP TSG GERAN#64, GP-140852, XP050894999, Nov. 2014, 6 pages.
(Continued)

*Primary Examiner* — Ivan O Latorre
(74) *Attorney, Agent, or Firm* — Leydig, Voit & Mayer, Ltd.

(57) ABSTRACT

Embodiments of the present disclosure provide a random access method, a terminal, and a base station. The method includes: receiving, by a terminal (UE), configuration information of random access resources from a base station, where the configuration information of the random access resource includes: configuration information of a first random access resource received from the base station using a system broadcast and configuration information of a second random access resource received from the base station by using downlink control information (DCI); selecting, by the UE, a random access resource from the first random access resource and the second random access resource according to a random access rule and the configuration information of the random access resources; and initiating, by the UE, random access according to the selected random access resource.

14 Claims, 3 Drawing Sheets

(56) References Cited

U.S. PATENT DOCUMENTS

| | | | | |
|---|---|---|---|---|
| 2010/0296467 | A1* | 11/2010 | Pelletier | H04W 74/002 370/329 |
| 2011/0014922 | A1* | 1/2011 | Jen | H04W 74/002 455/450 |
| 2012/0063305 | A1* | 3/2012 | Chiu | H04W 74/0833 370/230 |
| 2012/0275305 | A1* | 11/2012 | Lin | H04W 74/0841 370/235 |
| 2013/0003700 | A1* | 1/2013 | Zhang | H04W 76/19 370/331 |
| 2013/0242730 | A1* | 9/2013 | Pelletier | H04W 28/0284 370/230 |
| 2014/0029595 | A1* | 1/2014 | Tsuboi | H04W 74/0833 370/336 |
| 2014/0105155 | A1* | 4/2014 | Kim | H04L 1/1861 370/329 |
| 2014/0160926 | A1* | 6/2014 | Gage | H04W 74/0833 370/235 |
| 2014/0293915 | A1 | 10/2014 | Pelletier et al. | |
| 2014/0349712 | A1* | 11/2014 | Shukla | H04W 74/0833 455/561 |
| 2015/0016312 | A1* | 1/2015 | Li | H04W 74/0833 370/280 |
| 2015/0049697 | A1* | 2/2015 | Worrall | H04W 72/0413 370/329 |
| 2015/0156760 | A1* | 6/2015 | Yu | H04W 72/042 370/330 |
| 2015/0156800 | A1* | 6/2015 | Kato | H04L 5/0007 370/329 |
| 2016/0081065 | A1* | 3/2016 | Shi | H04W 72/048 370/329 |
| 2016/0113037 | A1* | 4/2016 | Mizusawa | H04L 5/14 370/280 |
| 2016/0128102 | A1* | 5/2016 | Jauh | H04W 74/0833 370/329 |
| 2016/0219622 | A1* | 7/2016 | Liu | H04L 5/0089 |
| 2016/0381711 | A1* | 12/2016 | Kim | H04W 72/04 370/329 |

FOREIGN PATENT DOCUMENTS

| | | |
|---|---|---|
| CN | 102440057 A | 5/2012 |
| CN | 103037530 A | 4/2013 |
| JP | 2007251287 A | 9/2007 |
| JP | 2010504031 A | 2/2010 |
| JP | 2011211321 A | 10/2011 |
| JP | 2012525083 A | 10/2012 |
| JP | 2012227746 A | 11/2012 |
| WO | 2014023026 A1 | 2/2014 |
| WO | 2014089699 A1 | 6/2014 |
| WO | 2014110907 A1 | 7/2014 |
| WO | 2014188811 A1 | 11/2014 |
| WO | 2015002439 A1 | 1/2015 |

OTHER PUBLICATIONS

"3rd Generation Partnership Project; Technical Specification Group GSM/EDGE Radio Access Network; Cellular System Support for Ultra Low Complexity and Low Throughput Internet of Things; (Release 13)", 3GPP Draft Technical Report, TR 45.8xx V0.3.0, XP050945568, Mar. 2015, 54 pages.

JP/2017-539250, Notice of Allowance, dated Apr. 25, 2019.

* cited by examiner

RANDOM ACCESS METHOD, TERMINAL, AND BASE STATION

CROSS-REFERENCE TO RELATED APPLICATIONS

This application is a continuation of International Application No. PCT/CN2015/071579, filed on Jan. 26, 2015, the disclosure of which is hereby incorporated by reference in its entirety.

TECHNICAL FIELD

The present disclosure relates to the field of wireless communications, and in particular, to a random access method, a terminal, and a base station.

BACKGROUND

In a wireless communications system, there is a random access resource to be used by a terminal (user equipment (UE)) during random access to a network when an emergent uplink service occurs. A process in which the UE establishes a connection to the network is referred to as a random access process.

Currently, in most systems, a random access resource is configured by using a system broadcast. However, once the random access resource is configured by using the system broadcast, if a configuration needs to be changed, a change can be made within only a change period. As a result, such a change takes place relatively slow. Such a configuration method is a practically "semi-static" configuration method. Moreover, once a configuration using a system broadcast is changed, all UEs need to be notified, resulting in a very high cost. Therefore, in some machine-to-machine (M2M) communications systems, if an emergency such as afire or an earthquake occurs and a network needs to rapidly change a configuration of a random access resource, network congestion occurs easily. If excessive uplink resources are configured for random access, within a fairly long period of time, these resources cannot be used by UE to send uplink data, causing a great waste of resources.

Therefore, how to flexibly configure a random access resource becomes a technical problem that needs an urgent solution.

SUMMARY

Embodiments of the present disclosure provide a random access method, a terminal, and a base station, to resolve at least a problem in the prior art that a random access resource cannot be flexibly configured, and to improve flexibility in configuring a random access resource.

To achieve the foregoing objective, the following technical solutions are used in the embodiments of the present disclosure.

According to a first aspect, a random access method is provided, where the method includes:

receiving, by a terminal (UE), configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI);

selecting, by the UE, a random access resource from the first random access resource and the second random access resource according to a random access rule and the configuration information of the random access resource that is notified by the base station; and initiating, by the UE, random access according to the random access resource.

With reference to the first aspect, in a first possible implementation manner of the first aspect, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

With reference to the first possible implementation manner of the first aspect, in a second possible implementation manner of the first aspect, if the random access rule includes the randomly selecting the random access resource, the selecting, by the UE, a random access resource from the first random access resource and the second random access resource according to a random access rule and the configuration information of the random access resource that is notified by the base station includes:

generating, by the UE, a random number; and selecting, by the UE, the random access resource from the first random access resource and the second random access resource according to the random number, a probability factor, and the configuration information of the random access resource that is notified by the base station.

With reference to the second possible implementation manner of the first aspect, in a third possible implementation manner of the first aspect, the selecting, by the UE, the random access resource from the first random access resource and the second random access resource according to the random number, a probability factor, and the configuration information of the random access resource that is notified by the base station includes:

if the random number is greater than the probability factor, selecting, by the UE, the first random access resource according to the configuration information of the random access resource that is notified by the base station; or if the random number is not greater than the probability factor, selecting, by the UE, the second random access resource according to the configuration information of the random access resource that is notified by the base station; or the selecting, by the UE, the random access resource from the first random access resource and the second random access resource according to the random number, a probability factor, and the configuration information of the random access resource that is notified by the base station includes:

if the random number is greater than the probability factor, selecting, by the UE, the second random access resource according to the configuration information of the random access resource that is notified by the base station; or if the random number is not greater than the probability factor, selecting, by the UE, the first random access resource according to the configuration information of the random access resource that is notified by the base station.

With reference to the second possible implementation manner of the first aspect or the third possible implementation manner of the first aspect, in a fourth possible implementation manner of the first aspect, the probability factor is obtained according to a notification of the system broadcast.

With reference to the first possible implementation manner of the first aspect, in a fifth possible implementation manner of the first aspect, if the random access rule includes the selecting the random access resource according to a type of a pre-sent service, the selecting, by the UE, a random access resource from the first random access resource and the second random access resource according to a random access rule and the configuration information of the random access resource that is notified by the base station includes:

if the pre-sent service is a periodic service, selecting, by the UE, the first random access resource according to the configuration information of the random access resource that is notified by the base station; or if the pre-sent service is an emergency service, selecting, by the UE, the second random access resource according to the configuration information of the random access resource that is notified by the base station; or the selecting, by the UE, a random access resource from the first random access resource and the second random access resource according to a random access rule and the configuration information of the random access resource that is notified by the base station includes:

if the pre-sent service has a requirement for a delay, selecting, by the UE, the first random access resource according to the configuration information of the random access resource that is notified by the base station; or if the pre-sent service does not have a requirement for a delay, selecting, by the UE, the second random access resource according to the configuration information of the random access resource that is notified by the base station.

With reference to a first possible implementation manner of the first aspect, in a sixth possible implementation manner of the first aspect, if the random access rule includes the selecting the random access resource nearest to a time-frequency resource of the UE, the selecting, by the UE, a random access resource from the first random access resource and the second random access resource according to a random access rule and the configuration information of the random access resource that is notified by the base station includes:

selecting, by the UE, the random access resource nearest to the time-frequency resource of the UE from the first random access resource and the second random access resource according to the configuration information of the random access resource that is notified by the base station.

With reference to the first possible implementation manner of the first aspect, in a seventh possible implementation manner of the first aspect, if the random access rule includes the selecting the random access resource according to a type of the UE, the selecting, by the UE, a random access resource from the first random access resource and the second random access resource according to a random access rule and the configuration information of the random access resource that is notified by the base station includes:

if a priority of the UE is a first priority, selecting, by the UE, the first random access resource according to the configuration information of the random access resource that is notified by the base station; or if a priority of the UE is a second priority, selecting, by the UE, the second random access resource according to the configuration information of the random access resource that is notified by the base station.

With reference to the first possible implementation manner of the first aspect, in an eighth possible implementation manner, if the random access rule includes the selecting the random access resource according to an access reason of the UE, the selecting, by the UE, a random access resource from the first random access resource and the second random access resource according to a random access rule and the configuration information of the random access resource that is notified by the base station includes:

if the access reason of the UE is an emergency call, selecting, by the UE, the first random access resource according to the configuration information of the random access resource that is notified by the base station; or if the access reason of the UE is a normal call, selecting, by the UE, the second random access resource according to the configuration information of the random access resource that is notified by the base station.

According to a second aspect, a random access method is provided, where the method includes:

determining, by a base station, configuration information of a first random access resource that is notified by using a system broadcast and configuration information of a second random access resource that is notified by using downlink control information (DCI);

notifying, by the base station, a terminal (UE) of the configuration information of the first random access resource by using the system broadcast; and notifying, by the base station, the UE of the configuration information of the second random access resource by using the DCI.

With reference to the second aspect, in a first possible implementation manner of the second aspect, the configuration information of the first random access resource includes a random access rule.

With reference to the second aspect, in a second possible implementation manner of the second aspect, the method further includes:

notifying, by the base station, the UE of a random access rule by using the system broadcast.

With reference to the first possible implementation manner of the second aspect or the second possible implementation manner of the second aspect, in a third possible implementation manner of the second aspect, the random access rule includes at least one of the following rules:

randomly selecting the random access resource;

selecting the random access resource according to a type of a pre-sent service;

selecting a random access resource nearest to a time-frequency resource of UE;

selecting the random access resource according to a type of the UE; or selecting the random access resource according to an access reason of the UE.

According to a third aspect, a terminal (UE) is provided, where the UE includes: a receiving unit, a selection unit, and an access unit, where the receiving unit is configured to receive configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI);

the selection unit is configured to select a random access resource from the first random access resource and the second random access resource according to a random access rule and the configuration information of the random access resource that is notified by the base station; and the access unit is configured to initiate random access according to the random access resource.

With reference to the third aspect, in a first possible implementation manner of the third aspect, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

With reference to the first possible implementation manner of the third aspect, in a second possible implementation manner of the third aspect, if the random access rule includes the randomly selecting the random access resource, the selection unit is specifically configured to:

generate a random number; and select the random access resource from the first random access resource and the second random access resource according to the random number, a probability factor, and the configuration information of the random access resource that is notified by the base station.

With reference to the second possible implementation manner of the third aspect, in a third possible implementation manner of the third aspect, the selection unit is specifically configured to:

if the random number is greater than the probability factor, select the first random access resource according to the configuration information of the random access resource that is notified by the base station; or if the random number is not greater than the probability factor, select the second random access resource according to the configuration information of the random access resource that is notified by the base station; or the selection unit is specifically configured to:

if the random number is greater than the probability factor, select the second random access resource according to the configuration information of the random access resource that is notified by the base station; or if the random number is not greater than the probability factor, select the first random access resource according to the configuration information of the random access resource that is notified by the base station.

With reference to the second possible implementation manner of the third aspect or the third possible implementation manner of the third aspect, in a fourth possible implementation manner of the third aspect, the probability factor is obtained according to a notification of the system broadcast.

With reference to the first possible implementation manner of the third aspect, in a fifth possible implementation manner of the third aspect, if the random access rule includes the selecting the random access resource according to a type of a pre-sent service, the selection unit is specifically configured to:

if the pre-sent service is a periodic service, select the first random access resource according to the configuration information of the random access resource that is notified by the base station; or if the pre-sent service is an emergency service, select the second random access resource according to the configuration information of the random access resource that is notified by the base station; or the selection unit is specifically configured to:

if the pre-sent service has a requirement for a delay, select the first random access resource according to the configuration information of the random access resource that is notified by the base station; or if the pre-sent service does not have a requirement for a delay, select the second random access resource according to the configuration information of the random access resource that is notified by the base station.

With reference to the first possible implementation manner of the third aspect, in a sixth possible implementation manner of the third aspect, if the random access rule includes the selecting the random access resource nearest to a time-frequency resource of the UE, the selection unit is specifically configured to:

select the random access resource nearest to the time-frequency resource of the UE from the first random access resource and the second random access resource according to the configuration information of the random access resource that is notified by the base station.

With reference to the first possible implementation manner of the third aspect, in a seventh possible implementation manner of the third aspect, if the random access rule includes the selecting the random access resource according to a type of the UE, the selection unit is specifically configured to:

if a priority of the UE is a first priority, select the first random access resource according to the configuration information of the random access resource that is notified by the base station; or if a priority of the UE is a second priority, select the second random access resource according to the configuration information of the random access resource that is notified by the base station.

With reference to the first possible implementation manner of the third aspect, in an eighth possible implementation manner, if the random access rule includes the selecting the random access resource according to an access reason of the UE, the selection unit is specifically configured to:

if the access reason of the UE is an emergency call, select the first random access resource according to the configuration information of the random access resource that is notified by the base station; or if the access reason of the UE is a normal call, select the second random access resource according to the configuration information of the random access resource that is notified by the base station.

According to a fourth aspect, abase station is provided, where the base station includes a determining unit and a notification unit, where the determining unit is configured to determine configuration information of a first random access resource that is notified by using a system broadcast and configuration information of a second random access resource that is notified by using downlink control information (DCI);

the notification unit is configured to: notify a terminal (UE) of the configuration information of the first random access resource by using the system broadcast; and notify the UE of the configuration information of the second random access resource by using the DCI.

With reference to the fourth aspect, in a first possible implementation manner of the fourth aspect, the configuration information of the first random access resource includes a random access rule.

With reference to the fourth aspect, in a second possible implementation manner of the fourth aspect, the notification unit is further configured to notify the UE of a random access rule by using the system broadcast.

With reference to the first possible implementation manner of the fourth aspect or the second possible implementation manner of the fourth aspect, in a third possible implementation manner of the fourth aspect, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

According to a fifth aspect, a terminal (UE) is provided, where the UE includes a receiver and a processor, where the receiver is configured to receive configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI);

the processor is configured to select a random access resource from the first random access resource and the second random access resource according to a random access rule and the configuration information of the random access resource that is notified by the base station; and the processor is further configured to initiate random access according to the random access resource.

With reference to the fifth aspect, in a first possible implementation manner of the fifth aspect, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

With reference to the first possible implementation manner of the fifth aspect, in a second possible implementation manner of the fifth aspect, if the random access rule includes the randomly selecting the random access resource, the processor is specifically configured to:

generate a random number; and select the random access resource from the first random access resource and the second random access resource according to the random number, a probability factor, and the configuration information of the random access resource that is notified by the base station.

With reference to the second possible implementation manner of the fifth aspect, in a third possible implementation manner of the fifth aspect, the processor is specifically configured to:

if the random number is greater than the probability factor, select the first random access resource according to the configuration information of the random access resource that is notified by the base station; or if the random number is not greater than the probability factor, select the second random access resource according to the configuration information of the random access resource that is notified by the base station; or the processor is specifically configured to:

if the random number is greater than the probability factor, select the second random access resource according to the configuration information of the random access resource that is notified by the base station; or if the random number is not greater than the probability factor, select the first random access resource according to the configuration information of the random access resource that is notified by the base station.

With reference to the second possible implementation manner of the fifth aspect or the third possible implementation manner of the fifth aspect, in a fourth possible implementation manner of the fifth aspect, the probability factor is obtained according to a notification of the system broadcast.

With reference to the first possible implementation manner of the fifth aspect, in a fifth possible implementation manner of the fifth aspect, if the random access rule includes the selecting the random access resource according to a type of a pre-sent service, the processor is specifically configured to:

if the pre-sent service is a periodic service, select the first random access resource according to the configuration information of the random access resource that is notified by the base station; or if the pre-sent service is an emergency service, select the second random access resource according to the configuration information of the random access resource that is notified by the base station; or the processor is specifically configured to:

if the pre-sent service has a requirement for a delay, select the first random access resource according to the configuration information of the random access resource that is notified by the base station; or if the pre-sent service does not have a requirement for a delay, select the second random access resource according to the configuration information of the random access resource that is notified by the base station.

With reference to the first possible implementation manner of the fifth aspect, in a sixth possible implementation manner of the fifth aspect, if the random access rule includes the selecting the random access resource nearest to a time-frequency resource of the UE, the processor is specifically configured to:

select the random access resource nearest to the time-frequency resource of the UE from the first random access resource and the second random access resource according to the configuration information of the random access resource that is notified by the base station.

With reference to the first possible implementation manner of the fifth aspect, in a seventh possible implementation manner of the fifth aspect, if the random access rule includes the selecting the random access resource according to a type of the UE, the processor is specifically configured to:

if a priority of the UE is a first priority, select the first random access resource according to the configuration information of the random access resource that is notified by the base station; or if a priority of the UE is a second priority, select the second random access resource according to the configuration information of the random access resource that is notified by the base station.

With reference to the first possible implementation manner of the fifth aspect, in an eighth possible implementation manner of the fifth aspect, if the random access rule includes the selecting the random access resource according to an access reason of the UE, the processor is specifically configured to:

if the access reason of the UE is an emergency call, select the first random access resource according to the configuration information of the random access resource that is notified by the base station; or if the access reason of the UE is a normal call, select the second random access resource according to the configuration information of the random access resource that is notified by the base station.

According to a sixth aspect, abase station is provided, where the base station includes a processor and a transmitter, where the processor is configured to determine configuration information of a first random access resource that is notified by using a system broadcast and configuration information of a second random access resource that is notified by using downlink control information (DCI); and the transmitter is configured to: notify a terminal (UE) of the configuration information of the first random access resource by using the system broadcast; and notify the UE of the configuration information of the second random access resource by using the DCI.

With reference to the sixth aspect, in a first possible implementation manner of the sixth aspect, the configuration information of the first random access resource includes a random access rule.

With reference to the sixth aspect, in a second possible implementation manner of the sixth aspect, the transmitter is further configured to notify the UE of a random access rule by using the system broadcast.

With reference to the first possible implementation manner of the sixth aspect or the second possible implementation manner of the sixth aspect, in a third possible implementation manner of the sixth aspect, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

Embodiments of the present disclosure provide a random access method, a terminal, and a base station. The method includes: receiving, by UE, configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI); selecting, by the UE, a random access resource from the first random access resource and the second random access resource according to a random access rule and the configuration information of the random access resource that is notified by the base station; and initiating, by the UE, random access according to the random access resource. Based on the foregoing solutions provided in the embodiments of the present disclosure, in the embodiments of the present disclosure, UE may select a random access resource from a first random access resource and a second random access resource according to a random access rule, configuration information of the first random access resource that is notified by a base station by using a system broadcast, and configuration information of the second random access resource that is notified by the base station by using DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by abase station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

BRIEF DESCRIPTION OF DRAWINGS

To describe the technical solutions in the embodiments of the present more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that, to facilitate clear description of the technical solutions in the embodiments of the present disclosure, words such as "first" and "second" are used in the embodiments of the present disclosure to distinguish between same items or similar items that provide basically same functions or purposes. A person skilled in the art may understand that the words such as "first" and "second" do not limit a quantity and an execution order.

It should be noted that in the following embodiments of the present disclosure, configuration information of a random access resource may specifically include: a time-frequency resource number, a sequence, a modulation and coding scheme (MCS), and the like. The random access resource may specifically include: a time-frequency resource, a sequence, and the like. This is not specifically limited in the embodiments of the present disclosure.

Embodiment 1

Figure 1:
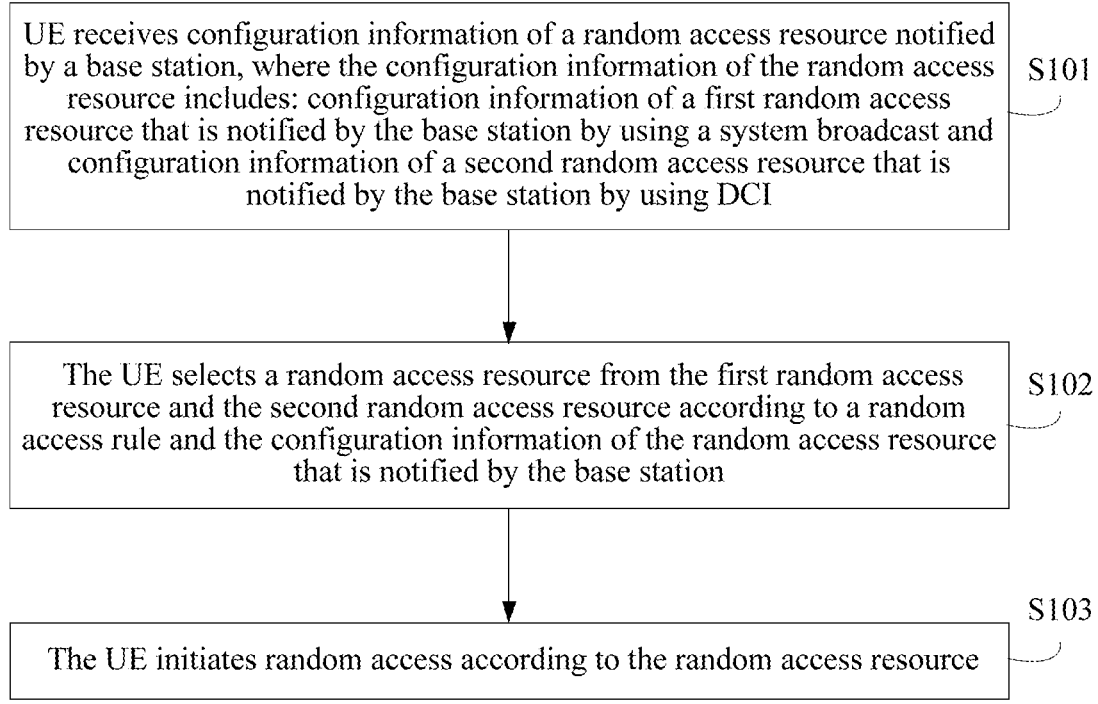
FIG. 1 is a first schematic flowchart of a random access method according to an embodiment of the present disclosure.

This embodiment of the present disclosure provides a random access method, as shown in FIG. 1, including the following steps.

S101: UE receives configuration information of a random access resource notified by a base station, where the configuration information of the random access resource includes configuration information of a first random access resource that is notified by the base station by using a system broadcast and configuration information of a second random access resource that is notified by the base station by using downlink control information (DCI).

S102: The UE selects a random access resource from the first random access resource and the second random access resource according to a random access rule and the configuration information of the random access resource that is notified by the base station.

S103: The UE initiates random access according to the random access resource.

Specifically, in the random access method provided in this embodiment of the present disclosure, the UE may select the random access resource from the first random access resource and the second random access resource according to the random access rule, the configuration information of the first random access resource that is notified by the base station by using the system broadcast, and the configuration information of the second random access resource that is notified by the base station by using the DCI, and then initiate random access. The random access rule may be pre-configured in the UE, or may be sent by the base station to the UE. For example, the random access rule is carried by using the configuration information of the first random access resource; or the random access rule is notified by using the system broadcast. This is not specifically limited in this embodiment of the present disclosure.

The random access rule may include at least one of the following rules:
randomly selecting the random access resource;
selecting the random access resource according to a type of a pre-sent service;
selecting the random access resource nearest to a time-frequency resource of the UE;
selecting the random access resource according to a type of the UE; or
selecting the random access resource according to an access reason of the UE.

It should be noted that the random access rule in this embodiment of the present disclosure may be one type of rule, or may be a combination of multiple types of rules. For example, the random access rule may include: selecting the random access resource according to a type of a pre-sent service and a type of the UE; or selecting the random access resource according to a type of a pre-sent service and an access reason of the UE. This is not specifically limited in this embodiment of the present disclosure.

It may be understood that the random access rule in this embodiment of the present disclosure may be another rule, and is not limited to the specific random access rules listed above. This is not specifically limited in this embodiment of the present disclosure.

Further, in this embodiment of the present disclosure, for different random access rules, manners of selecting the random access resource are different. Some possible manners of selecting the random access resource according to the random access rule are provided as follows:

Manner 1

In a possible implementation manner, if the random access rule includes the randomly selecting the random access resource, the selecting, by the UE, a random access resource from the first random access resource and the second random access resource according to a random access rule and the configuration information of the random access resource that is notified by the base station may specifically include:

generating, by the UE, a random number; and
selecting, by the UE, the random access resource from the first random access resource and the second random access resource according to the random number, a probability factor, and the configuration information of the random access resource that is notified by the base station.

Specifically, the probability factor may be obtained according to a notification of the system broadcast, or may be pre-configured in the UE. This is not specifically limited in this embodiment of the present disclosure.

The selecting, by the UE, the random access resource from the first random access resource and the second random access resource according to the random number, a probability factor, and the configuration information of the random access resource that is notified by the base station may specifically include:

if the random number is greater than the probability factor, selecting, by the UE, the first random access resource according to the configuration information of the random access resource that is notified by the base station; or if the random number is not greater than the probability factor, selecting, by the UE, the second random access resource according to the configuration information of the random access resource that is notified by the base station; or the selecting, by the UE, the random access resource from the first random access resource and the second random access resource according to the random number, a probability factor, and the configuration information of the random access resource that is notified by the base station includes:

if the random number is greater than the probability factor, selecting, by the UE, the second random access resource according to the configuration information of the random access resource that is notified by the base station; or if the random number is not greater than the probability factor, selecting, by the UE, the first random access resource according to the configuration information of the random access resource that is notified by the base station.

Specifically, in this implementation manner, the UE randomly selects a random access resource. For example, the UE may generate a random number. If the random number is greater than the probability factor, the UE selects the second random access resource according to the configuration information of the random access resource that is notified by the base station; or if the random number is not greater than the probability factor, the UE selects the first random access resource according to the configuration information of the random access resource that is notified by the base station. For example, it is assumed that the probability factor is 0.5, and the random number generated by the UE is 0.8. Because 0.8>0.5, in this case, the UE chooses to monitor the DCI according to the random access rule, that is, the UE selects the second random access resource corresponding to the configuration information of the second random access resource that is notified by the base station by using the DCI. For example, it is assumed that the probability factor is 0.9, and the random number generated by the UE is 0.8. Because 0.9>0.8, in this case, the UE selects the first random access resource corresponding to the configuration information of the first random access resource that is notified by the base station by using the system broadcast.

Manner 2

In a possible implementation manner, if the random access rule includes the selecting the random access resource according to a type of a pre-sent service, the selecting, by the UE, a random access resource from the first random access resource and the second random access resource according to a random access rule and the configuration information of the random access resource that is notified by the base station includes:

if the pre-sent service is a periodic service, selecting, by the UE, the first random access resource according to the configuration information of the random access resource that is notified by the base station; or if the pre-sent service is an emergency service, selecting, by the UE, the second random access resource according to the configuration information of the random access resource that is notified by the base station; or the selecting, by the UE, a random access resource from the first random access resource and the second random access resource according to a random access rule and the configuration information of the random access resource that is notified by the base station includes:

if the pre-sent service has a requirement for a delay, selecting, by the UE, the first random access resource according to the configuration information of the random access resource that is notified by the base station; or if the pre-sent service does not have a requirement for a delay, selecting, by the UE, the second random access resource according to the configuration information of the random access resource that is notified by the base station.

Specifically, in this implementation manner, the UE selects the random access resource according to the type of the pre-sent service. For example, an emergency service usually needs rapid change of a configuration of the random access resource, and may need more uplink data resources. It is considered that a base station sends DCI more frequently than the base station sends a system broadcast, and more idle uplink resources can be allocated for random access. Therefore, the UE may initiate random access according to the second random access resource corresponding to the configuration information of the second random access resource that is notified by the base station by using the DCI. A periodic service is relatively fixed. Therefore, to reduce a waiting time of the UE, the UE may directly select, without monitoring the DCI, the first random access resource corresponding to the configuration information of the first random access resource that is notified by the base station by using the system broadcast, to initiate random access.

Alternatively, usually, for a service that has a requirement for a delay, rapid access to a network is needed when a delay is relatively small. Considering that the configuration information of the first random access resource that is notified by the base station by using the system broadcast is relatively fixed, the UE may not need to wait, and may directly initiate random access according to the first random access resource corresponding to the configuration information. Therefore, the UE may select the first random access resource corresponding to the configuration information of the first random access resource that is notified by the base station by using the system broadcast, to initiate random access. Otherwise, for a service that does not have a requirement for a delay, the UE may select the second random access resource corresponding to the configuration information of the second random access resource that is notified by the base station by using the DCI, to initiate random access. As can be known according to the foregoing example, the UE may select, according to the random access rule, the random access resource to initiate random access. Therefore, a problem in the prior art that a random access resource cannot be flexibly configured is avoided, so that an access resource can be flexibly configured, thereby achieving an optimal configuration.

Certainly, the type of the pre-sent service may be another type, for example, a high-priority service or a low-priority service. For different service types, random access resources selected by the UE may also be different. This is not specifically limited in this embodiment of the present disclosure.

Manner 3

In a possible implementation manner, if the random access rule includes the selecting the random access resource nearest to a time-frequency resource of the UE, the selecting, by the UE, a random access resource from the first random access resource and the second random access resource according to a random access rule and the configuration information of the random access resource that is notified by the base station includes:

selecting, by the UE, the random access resource nearest to the time-frequency resource of the UE from the first random access resource and the second random access resource according to the configuration information of the random access resource that is notified by the base station.

Specifically, in this implementation manner, the UE selects the random access resource nearest to the time-frequency resource of the UE. For example, assuming that after receiving the configuration information of the first random access resource that is notified by the base station by using the system broadcast and the configuration information of the second random access resource that is notified by the base station by using the DCI, the UE determines that the random access resource nearest to the time-frequency resource of the UE in the first random access resource is before the random access resource nearest to the time-frequency resource of the UE in the second random access resource, the UE selects the first random access resource to initiate random access. Otherwise, if determining that the random access resource nearest to the time-frequency resource of the UE in the first random access resource is after the random access resource nearest to the time-frequency resource of the UE in the second random access resource, the UE selects the second random access resource to initiate random access.

Manner 4

In a possible implementation manner, if the random access rule includes the selecting the random access resource according to a type of the UE, the selecting, by the UE, a random access resource from the first random access resource and the second random access resource according to a random access rule and the configuration information of the random access resource that is notified by the base station includes:

if a priority of the UE is a first priority, selecting, by the UE, the first random access resource according to the configuration information of the random access resource that is notified by the base station; or if a priority of the UE is a second priority, selecting, by the UE, the second random access resource according to the configuration information of the random access resource that is notified by the base station.

Specifically, in this implementation manner, the UE selects the random access resource according to the type of the UE. For example, the first priority is specifically a low priority, and the second priority is specifically a high priority. The random access rule is specifically: UE having a low priority selects the first random access resource corresponding to the configuration information of the first random access resource that is notified by the base station by using the system broadcast, and UE having a high priority selects the second random access resource corresponding to the configuration information of the second random access resource that is notified by the base station by using the DCI. If the UE is a UE having a high priority, the UE may select, according to the random access rule, the second random access resource corresponding to the configuration information of the second random access resource that is notified by the base station by using the DCI, to initiate random access.

Certainly, the type of the UE may be another type, for example, a low mobility or a high mobility. For different types of the UE, random access resources selected by the UE may also be different. This is not specifically limited in this embodiment of the present disclosure.

Manner 5

In a possible implementation manner, if the random access rule includes the selecting the random access resource according to an access reason of the UE, the selecting, by the UE, a random access resource from the first random access resource and the second random access resource according to a random access rule and the configuration information of the random access resource that is notified by the base station includes:

if the access reason of the UE is an emergency call, selecting, by the UE, the first random access resource according to the configuration information of the random access resource that is notified by the base station; or if the access reason of the UE is a normal call, selecting, by the UE, the second random access resource according to the configuration information of the random access resource that is notified by the base station.

Specifically, in this implementation manner, the UE selects the random access resource according to the access reason of the UE. For example, if the access reason of the UE is an emergency call, that is, rapid access to a network is needed when a delay is relatively small. Considering that the configuration information of the first random access resource that is notified by the base station by using the system broadcast is relatively fixed, the UE may directly initiate, without waiting, random access according to the first random access resource corresponding to the configuration information. Therefore, the UE may select the first random access resource corresponding to the configuration information of the first random access resource that is notified by the base station by using the system broadcast, to initiate random access. Otherwise, when the access reason of the UE is a normal call, the UE may select the second random access resource corresponding to the configuration information of the second random access resource that is notified by the base station by using the DCI, to initiate random access.

Certainly, the access reason of the UE may be another reason, for example, tracking area update (TAU), signaling access, data access, coverage level change access, connected mode access, or idle mode access. This is not specifically limited in this embodiment of the present disclosure.

Using the Long Term Evolution (LTE) as an example, the access reason of the UE may include: emergency access, high priority access, mobile terminating (MT) access, mobile originating (MO) signaling access, MO data access, and delay tolerant access MT access is actually a response of, for example, a paging message; and MO access refers to access triggered by a terminal.

For different access reasons, random access resources selected by the UE may also be different. For example, UE in a connected mode preferentially uses the second random access resource corresponding to the configuration information of the second random access resource that is notified by using the DCI. UE in an idle mode may preferentially use the first random access resource corresponding to the configuration information of the first random access resource that is notified by using the system broadcast. This is not specifically limited in this embodiment of the present disclosure.

As described above, the random access rule in this embodiment of the present disclosure may be a fixed rule, or may be a combination of multiple rules. Therefore, it may be understood that in this embodiment of the present disclosure, the random access rules provided in Manner 1 to Manner 5 and the method for notifying configuration information of a random access resource by the base station may be combined.

For example, assuming that the random access rule may include selecting the random access resource according to a type of a pre-sent service and a type of the UE, the selecting, by the UE, a random access resource from the first random access resource and the second random access resource according to a random access rule and the configuration information of the random access resource that is notified by the base station specifically includes:

when the pre-sent service is an emergency service and the priority of the UE is a high priority, selecting, by the UE, the first random access resource according to the configuration information of the random access resource that is notified by the base station;

when the pre-sent service is an emergency service and the priority of the UE is a low priority, selecting, by the UE, the second random access resource according to the configuration information of the random access resource that is notified by the base station;

when the pre-sent service is a periodic service and the priority of the UE is a high priority, selecting, by the UE, the first random access resource according to the configuration information of the random access resource that is notified by the base station; or when the pre-sent service is a periodic service and the priority of the UE is a low priority, selecting, by the UE, the second random access resource according to the configuration information of the random access resource that is notified by the base station.

When an emergency such as a fire occurs, the emergency service may need rapid change of the configuration of the random access resource, and more uplink data resources may be needed. Moreover, UE having a high priority may perform rapid access. Therefore, it may be configured that the UE having a high priority selects the first random access resource corresponding to the configuration information of the first random access resource that is notified by the base station by using the system broadcast, and UE having a low priority selects the second random access resource corresponding to the configuration information of the second random access resource that is notified by the base station by using the DCI. In this way, according one aspect, it is considered that a base station sends DCI more frequently than the base station sends a system broadcast, and more idle uplink resources can be allocated for random access. Therefore, rapid change of the configuration information of the random access resource may be implemented. Moreover, more access resources can be allocated. For example, all uplink resources that are not used may be configured to be random access resources. According to the other aspect, the configuration information of the first random access resource that is notified by the base station by using the system broadcast is relatively fixed, the UE may directly initiate random access according to the first random access resource corresponding to the configuration information, thereby reducing a waiting time of the UE, and implementing rapid access. The UE may select the random access resource according to the random access rule and the configuration information of the random access resource that is notified by the base station to initiate random access. Therefore, a problem in the prior art that a random access resource cannot be flexibly configured is resolved, so that flexibility of configuring a random access resource can be improved, thereby achieving an optimal configuration.

It may be understood that in this embodiment of the present disclosure, the UE may select the random access resource according to the random access rule in another manner. Manners are not limited to the implementation manners provided above.

This embodiment of the present disclosure provides a random access method, including: receiving, by UE, configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI); selecting, by the UE, a random access resource from the first random access resource and the second random access resource according to a random access rule and the configuration information of the random access resource that is notified by the base station; and initiating, by the UE, random access according to the random access resource. Based on the random access method provided in this embodiment of the present disclosure, UE in this embodiment of the present disclosure may select a random access resource from a first random access resource and a second random access resource according to a random access rule, configuration information of the first random access resource that is notified by a base station by using a system broadcast, and configuration information of the second random access resource that is notified by the base station by using DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

Embodiment 2

Figure 2:
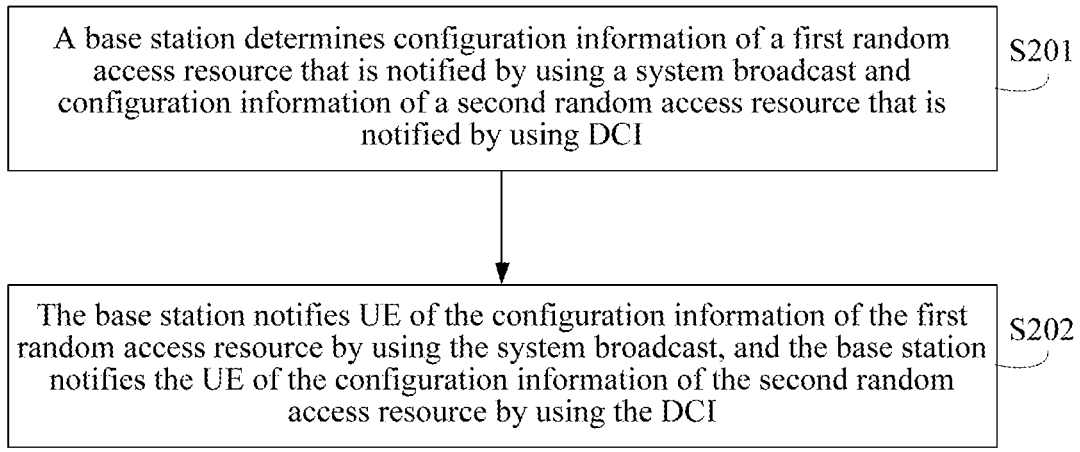
FIG. 2 is a second schematic flowchart of a random access method according to an embodiment of the present disclosure.

This embodiment of the present disclosure provides a random access method, as shown in FIG. 2, which specifically includes the following steps:

S201: A base station determines configuration information of a first random access resource that is notified by using a system broadcast and configuration information of a second random access resource that is notified by using DCI.

S202: The base station notifies UE of the configuration information of the first random access resource by using the system broadcast, and the base station notifies the UE of the configuration information of the second random access resource by using the DCI.

Specifically, in this embodiment of the present disclosure, when the base station configures a random access resource, the configuration information of a part of random access resources (the first random access resource) is notified to the UE by using the system broadcast, and the configuration information of a part of random access resources (the second random access resource) is notified to the UE by using the DCI.

The configuration information of the first random access resource that is notified by using the system broadcast is relatively fixed. The UE may directly initiate random access without monitoring the DCI, thereby reducing a waiting time of the UE.

The base station sends DCI more frequently than the base station sends a system broadcast, and more idle uplink resources can be allocated for random access. Therefore, the configuration information of the second random access resource that is notified by using the DCI can rapidly change a configuration of the random access resource, more idle uplink resources can be allocated for random access, and a coding and modulation scheme may be flexibly adjusted.

It should be noted that after notifying the UE of the configuration information of the first random access resource by using the system broadcast and notifying the UE of the configuration information of the second random access resource by using the DCI, the base station may further obtain related information about the UE according to the random access resource occupied by the UE when the UE initiates random access, where the information includes an access reason, a type of the UE, and the like. In this way, different mechanisms may be used for subsequent scheduling for the information. For example, UE having a requirement for a short delay is preferentially scheduled. This is not specifically limited in this embodiment of the present disclosure.

It should be noted that in this embodiment of the present disclosure, the base station may configure all idle resources as random access resources. In this case, the base station first needs to have an agreement with the UE that it is the UE that selects an uplink resource that is not scheduled and uses the selected uplink resource. In this case, the UE needs to find a used uplink resource by monitoring the DCI, and further performs random access by using an unoccupied uplink resource. This case is not specifically limited in this embodiment of the present disclosure.

Further, the configuration information of the first random access resource may further include a random access rule.

That is, a corresponding quantity of bits may be added to the configuration information of the first random access resource, to add the random access rule.

Optionally, the base station may notify the UE of the random access rule by using the system broadcast.

That is, the base station may add a corresponding quantity of bits to the system broadcast, to add the random access rule.

Certainly, the base station may notify the UE of the random access rule by using another message or signaling. This is not specifically limited in this embodiment of the present disclosure.

The random access rule may include at least one of the following rules:

randomly selecting the random access resource;

selecting the random access resource according to a type of a pre-sent service;

selecting a random access resource nearest to a time-frequency resource of UE;

selecting the random access resource according to a type of the UE; or selecting the random access resource according to an access reason of the UE.

It should be noted that the random access rule in this embodiment of the present disclosure may be one type of rule, or may be a combination of multiple types of rules. For example, the random access rule may include: selecting the random access resource according to a type of a pre-sent service and a type of the UE; or selecting the random access resource according to a type of a pre-sent service and an access reason of the UE. This is not specifically limited in this embodiment of the present disclosure.

It may be understood that the random access rule in this embodiment of the present disclosure may be another rule, and is not limited to the specific random access rules listed above. This is not specifically limited in this embodiment of the present disclosure.

The random access method provided based on this embodiment of the present disclosure includes: determining, by a base station, configuration information of a first random access resource that is notified by using a system broadcast and configuration information of a second random access resource that is notified by using DCI; and notifying, by the base station, UE of the configuration information of the first random access resource by using the system broadcast, and notifying, by the base station, the UE of the configuration information of the second random access resource, so that the UE may select a random access resource according to the configuration information of the first random access resource that is notified by the base station by using the system broadcast and the configuration information of the second random access resource that is notified by the base station by using the DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

Embodiment 3

Figure 3:
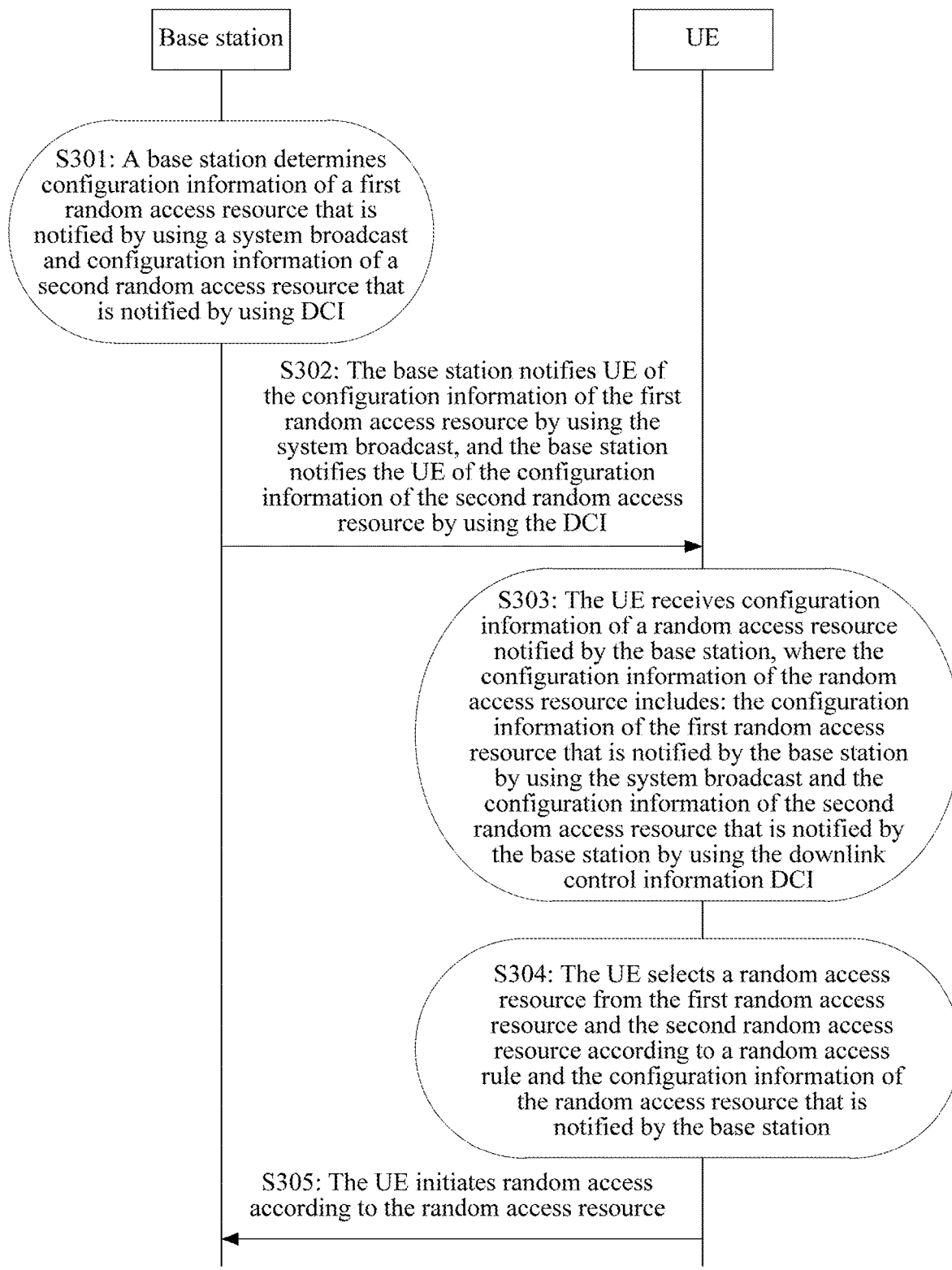
FIG. 3 is a schematic diagram of interaction of a random access method according to an embodiment of the present disclosure.

This embodiment of the present disclosure provides a random access method. Interaction between UE and a base station is used as an example for description. As shown in FIG. 3, the method includes the following steps:

S301: The base station determines configuration information of a first random access resource that is notified by using a system broadcast and configuration information of a second random access resource that is notified by using DCI.

S302: The base station notifies the UE of the configuration information of the first random access resource by using the system broadcast, and the base station notifies the UE of the configuration information of the second random access resource by using the DCI.

S303: The UE receives configuration information of a random access resource notified by the base station, where the configuration information of the random access resource includes: the configuration information of the first random access resource that is notified by the base station by using the system broadcast and the configuration information of the second random access resource that is notified by the base station by using the downlink control information (DCI).

S304: The UE selects a random access resource from the first random access resource and the second random access resource according to a random access rule and the configuration information of the random access resource that is notified by the base station.

S305: The UE initiates random access according to the random access resource.

Specifically, for specific implementation of steps S301 and S302, refer to the related description of Embodiment 2. For specific implementation of steps S303 to S305, refer to the related description of Embodiment 1. Details are not described in this embodiment of the present disclosure again.

Because this embodiment is a specific description about the foregoing embodiments, reference may be to the foregoing descriptions for a technical effect that can be implemented in this embodiment. Details are not described herein again.

Embodiment 4

Figure 4:
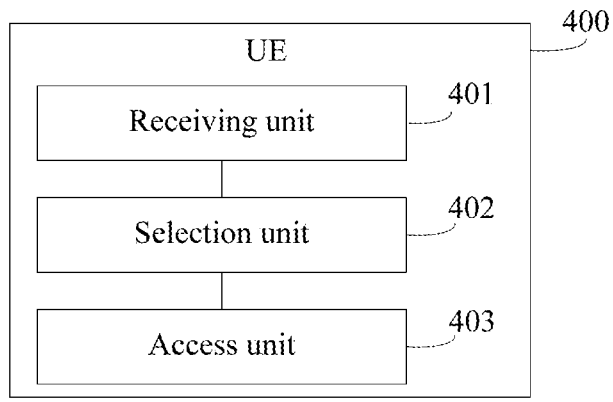
FIG. 4 is a first schematic structural diagram of UE according to an embodiment of the present disclosure.

This embodiment of the present disclosure provides a terminal 400. Specifically, as shown in FIG. 4, the UE 400 includes: a receiving unit 401, a selection unit 402, and an access unit 403.

The receiving unit 401 is configured to receive configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI).

The selection unit 402 is configured to select a random access resource from the first random access resource and the second random access resource according to a random access rule and the configuration information of the random access resource that is notified by the base station.

The access unit 403 is configured to initiate random access according to the random access resource.

Specifically, the random access rule may include at least one of the following rules:
randomly selecting the random access resource;
selecting the random access resource according to a type of a pre-sent service;
selecting the random access resource nearest to a time-frequency resource of the UE;
selecting the random access resource according to a type of the UE; or
selecting the random access resource according to an access reason of the UE.

In a possible implementation manner, if the random access rule includes the randomly selecting the random access resource, the selection unit 402 is specifically configured to:
generate a random number; and select the random access resource from the first random access resource and the second random access resource according to the random number, a probability factor, and the configuration information of the random access resource that is notified by the base station.

Further, the selection unit 402 is specifically configured to:
if the random number is greater than the probability factor, select the first random access resource according to the configuration information of the random access resource that is notified by the base station; or
if the random number is not greater than the probability factor, select the second random access resource according to the configuration information of the random access resource that is notified by the base station; or the selection unit 402 is specifically configured to:
if the random number is greater than the probability factor, select the second random access resource according to the configuration information of the random access resource that is notified by the base station; or
if the random number is not greater than the probability factor, select the first random access resource according to the configuration information of the random access resource that is notified by the base station.

Preferably, the probability factor is obtained according to a notification of the system broadcast.

In a possible implementation manner, if the random access rule includes the selecting the random access resource according to a type of a pre-sent service, the selection unit 402 is specifically configured to:
if the pre-sent service is a periodic service, select the first random access resource according to the configuration information of the random access resource that is notified by the base station; or
if the pre-sent service is an emergency service, select the second random access resource according to the configuration information of the random access resource that is notified by the base station; or the selection unit 402 is specifically configured to:
if the pre-sent service has a requirement for a delay, select the first random access resource according to the configuration information of the random access resource that is notified by the base station; or
if the pre-sent service does not have a requirement for a delay, select the second random access resource according to the configuration information of the random access resource that is notified by the base station.

In a possible implementation manner, if the random access rule includes the selecting the random access resource nearest to a time-frequency resource of the UE, the selection unit 402 is specifically configured to:
select the random access resource nearest to the time-frequency resource of the UE 400 from the first random access resource and the second random access resource according to the configuration information of the random access resource that is notified by the base station.

In a possible implementation manner, if the random access rule includes the selecting the random access resource according to a type of the UE, the selection unit 402 is specifically configured to:
if a priority of the UE 400 is a first priority, select the first random access resource according to the configuration information of the random access resource that is notified by the base station; or
if a priority of the UE 400 is a second priority, select the second random access resource according to the configuration information of the random access resource that is notified by the base station.

In a possible implementation manner, if the random access rule includes the selecting the random access resource according to an access reason of the UE, the selection unit 402 is specifically configured to:
if the access reason of the UE 400 is an emergency call, select the first random access resource according to the configuration information of the random access resource that is notified by the base station; or
if the access reason of the UE 400 is a normal call, select the second random access resource according to the configuration information of the random access resource that is notified by the base station.

Specifically, for a method for performing random access by the UE 400 provided in this embodiment of the present disclosure, refer to the description about Embodiment 1 or Embodiment 3. Details are not described in this embodiment of the present disclosure again.

This embodiment of the present disclosure provides UE, including: the receiving unit, receiving configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI); the selection unit, selecting a random access resource from the first random access resource and the second random access resource according to a random access rule and the configuration information of the random access resource that is notified by the base station; and the access unit, initiating random access according to the random access resource. Based on the UE provided in this embodiment of the present disclosure, the UE in this embodiment of the present disclosure may select a random access resource from a first random access resource and a second random access resource according to a random access rule, configuration information of the first random access resource that is notified by a base station by using a system broadcast, and configuration information of the second random access resource that is notified by the base station by using DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

Embodiment 5

Figure 5:
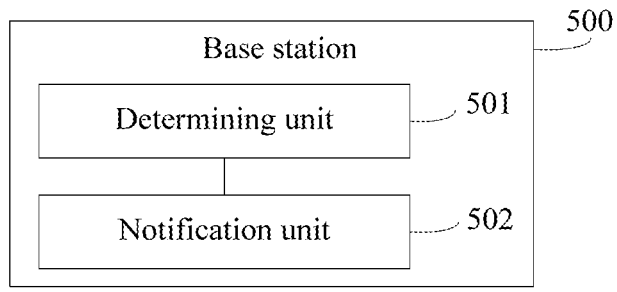
FIG. 5 is a first schematic structural diagram of a base station according to an embodiment of the present disclosure.

This embodiment of the present disclosure provides a base station 500. Specifically, as shown in FIG. 5, the base station 500 includes a determining unit 501 and a notification unit 502.

The determining unit 501 is configured to determine configuration information of a first random access resource that is notified by using a system broadcast and configuration information of a second random access resource that is notified by using downlink control information (DCI).

The notification unit 502 is configured to: notify a terminal of the configuration information of the first random access resource by using the system broadcast; and notify the UE of the configuration information of the second random access resource by using the DCI.

Further, the configuration information of the first random access resource includes a random access rule.

Optionally, the notification unit 502 is further configured to notify the UE of a random access rule by using the system broadcast.

Specifically, the random access rule may include at least one of the following rules:
randomly selecting the random access resource;
selecting the random access resource according to a type of a pre-sent service;
selecting the random access resource nearest to a time-frequency resource of the UE;
selecting the random access resource according to a type of the UE; or
selecting the random access resource according to an access reason of the UE.

Specifically, for a method for performing random access by the base station 500 provided in this embodiment of the present disclosure, refer to the description about Embodiment 2 or Embodiment 3. Details are not described in this embodiment of the present disclosure again.

The base station provided based on this embodiment of the present disclosure includes: the determining unit, determining configuration information of a first random access resource that is notified by using a system broadcast and configuration information of a second random access resource that is notified by using DCI; and the notification unit, notifying UE of the configuration information of the first random access resource by using the system broadcast, and notifying the UE of the configuration information of the second random access resource by using the DCI, so that the UE may select a random access resource according to the configuration information of the first random access resource that is notified by the base station by using the system broadcast and the configuration information of the second random access resource that is notified by the base station by using the DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

Embodiment 6

Figure 6:
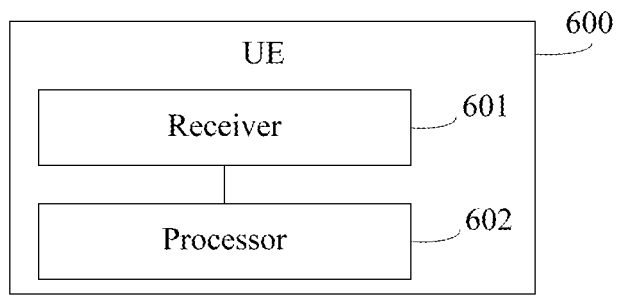
FIG. 6 is a second schematic structural diagram of UE according to an embodiment of the present disclosure.

This embodiment of the present disclosure provides UE 600. Specifically, as shown in FIG. 6, the UE 600 includes a receiver 601 and a processor 602.

The receiver 601 is configured to receive configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI).

The processor 602 is configured to select a random access resource from the first random access resource and the second random access resource according to a random access rule and the configuration information of the random access resource that is notified by the base station.

The processor 602 is further configured to initiate random access according to the random access resource.

Specifically, the random access rule includes at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

In a possible implementation manner, if the random access rule includes the randomly selecting the random access resource, the processor 602 is specifically configured to:

generate a random number; and select the random access resource from the first random access resource and the second random access resource according to the random number, a probability factor, and the configuration information of the random access resource that is notified by the base station.

Further, the processor 602 is specifically configured to:

if the random number is greater than the probability factor, select the first random access resource according to the configuration information of the random access resource that is notified by the base station; or if the random number is not greater than the probability factor, select the second random access resource according to the configuration information of the random access resource that is notified by the base station; or the processor 602 is specifically configured to:

if the random number is greater than the probability factor, select the second random access resource according to the configuration information of the random access resource that is notified by the base station; or if the random number is not greater than the probability factor, select the first random access resource according to the configuration information of the random access resource that is notified by the base station.

Preferably, the probability factor is obtained according to a notification of the system broadcast.

In a possible implementation manner, if the random access rule includes the selecting the random access resource according to a type of a pre-sent service, the processor 602 is specifically configured to:

if the pre-sent service is a periodic service, select the first random access resource according to the configuration information of the random access resource that is notified by the base station; or if the pre-sent service is an emergency service, select the second random access resource according to the configuration information of the random access resource that is notified by the base station; or the processor 602 is specifically configured to:

if the pre-sent service has a requirement for a delay, select the first random access resource according to the configuration information of the random access resource that is notified by the base station; or if the pre-sent service does not have a requirement for a delay, select the second random access resource according to the configuration information of the random access resource that is notified by the base station.

In a possible implementation manner, if the random access rule includes the selecting the random access resource nearest to a time-frequency resource of the UE 600, the processor 602 is specifically configured to:

select the random access resource nearest to the time-frequency resource of the UE 600 from the first random access resource and the second random access resource according to the configuration information of the random access resource that is notified by the base station.

In a possible implementation manner, if the random access rule includes the selecting the random access resource according to a type of the UE, the processor 602 is specifically configured to:

if a priority of the UE 600 is a first priority, select the first random access resource according to the configuration information of the random access resource that is notified by the base station; or if a priority of the UE 600 is a second priority, select the second random access resource according to the configuration information of the random access resource that is notified by the base station.

In a possible implementation manner, if the random access rule includes the selecting the random access resource according to an access reason of the UE, the processor 602 is specifically configured to:

if the access reason of the UE 600 is an emergency call, select the first random access resource according to the configuration information of the random access resource that is notified by the base station; or if the access reason of the UE 600 is a normal call, select the second random access resource according to the configuration information of the random access resource that is notified by the base station.

Specifically, for a method for performing random access by the UE 600 provided in this embodiment of the present disclosure, refer to the description about Embodiment 1 or Embodiment 3. Details are not described in this embodiment of the present disclosure again.

This embodiment of the present disclosure provides UE, including: the receiver, receiving configuration information of a random access resource notified by a base station, where the configuration information of the random access resource includes: configuration information of a first random access resource that is notified by the base station by using a system broadcast and configuration information of a second random access resource that is notified by the base station by using downlink control information (DCI); and the processor, selecting a random access resource from the first random access resource and the second random access resource according to a random access rule and the configuration information of the random access resource that is notified by the base station, and initiating random access according to the random access resource. Based on the UE provided in this embodiment of the present disclosure, the UE in this embodiment of the present disclosure may select a random access resource from a first random access resource and a second random access resource according to a random access rule, configuration information of the first random access resource that is notified by a base station by using a system broadcast, and configuration information of the second random access resource that is notified by the base station by using DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

Embodiment 7

Figure 7:
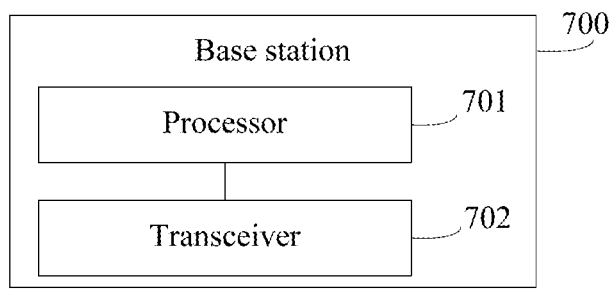
FIG. 7 is a second schematic structural diagram of a base station according to an embodiment of the present disclosure.

This embodiment of the present disclosure provides a base station 700. Specifically, as shown in FIG. 7, the base station 700 includes a processor 701 and a transmitter 702.

The processor 701 is configured to determine configuration information of a first random access resource that is notified by using a system broadcast and configuration information of a second random access resource that is notified by using downlink control information (DCI).

The transmitter 702 is configured to: notify a terminal of the configuration information of the first random access resource by using the system broadcast; and notify the UE of the configuration information of the second random access resource by using the DCI.

Further, the configuration information of the first random access resource includes a random access rule.

Optionally, the transmitter 702 is further configured to notify the UE of a random access rule by using the system broadcast.

Specifically, the random access rule may include at least one of the following rules:

randomly selecting the random access resource;

selecting the random access resource according to a type of a pre-sent service;

selecting the random access resource nearest to a time-frequency resource of the UE;

selecting the random access resource according to a type of the UE; or selecting the random access resource according to an access reason of the UE.

Specifically, for a method for performing random access by the base station 700 provided in this embodiment of the present disclosure, refer to the description about Embodiment 2 or Embodiment 3. Details are not described in this embodiment of the present disclosure again.

The base station provided based on this embodiment of the present disclosure includes: the processor, determining configuration information of a first random access resource that is notified by using a system broadcast and configuration information of a second random access resource that is notified by using DCI; and the transmitter, notifying UE of the configuration information of the first random access resource by using the system broadcast, and notifying the UE of the configuration information of the second random access resource by using the DCI, so that the UE may select a random access resource according to the configuration information of the first random access resource that is notified by the base station by using the system broadcast and the configuration information of the second random access resource that is notified by the base station by using the DCI. It is considered that a base station sends DCI more frequently than the base station sends a system broadcast, and more idle uplink resources can be allocated for random access. Therefore, when an emergency such as a fire or an earthquake occurs, a network needs to rapidly change a configuration of a random access resource, and more uplink data resources are needed, UE may initiate random access according to a second random access resource corresponding to configuration information of the second random access resource that is notified by a base station by using DCI. Configuration information of a first random access resource that is notified by the base station by using a system broadcast is relatively fixed. Therefore, the UE may directly initiate random access according to the first random access resource corresponding to the configuration information, thereby reducing a waiting time of the UE. That is, the UE may flexibly select, according to a random access rule, a random access resource to initiate random access, thereby avoiding a problem in the prior art that a random access resource cannot be flexibly configured, so that flexibility of configuring a random access resource can be improved, thereby achieving an optimal configuration.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A random access method, comprising:
    receiving, by a terminal (UE), configuration information of random access resources from a base station, wherein the configuration information of the random access resources comprises: configuration information of a first random access resource received from the base station via a system broadcast and configuration information of a second random access resource received from the base station via downlink control information (DCI);
    selecting, by the UE, a random access resource from the first random access resource and the second random access resource according to a random access rule and the configuration information of the random access resources received from the base station; and
    initiating, by the UE, random access according to the selected random access resource,
    wherein the selecting the random access resource further comprises at least one of: randomly selecting the random access resource, selecting the random access resource according to a type of a pre-sent service, selecting the random access resource nearest to a time-frequency resource of the UE, selecting the random access resource according to a type of the UE, or selecting the random access resource according to an access reason of the UE;
    when the random access resource is randomly selected, the selecting the random access resource further comprises:
        generating, by the UE, a random number;
        selecting, by the UE, the random access resource according to the random number, a probability factor, and the configuration information of the random access resources received from the base station, wherein:
            when the random number is greater than the probability factor, selecting, by the UE, the first random access resource according to the configuration information of the random access resources received from the base station; and
            when the random number is not greater than the probability factor, selecting, by the UE, the second random access resource according to the configuration information of the random access resources received from the base station.

2. The method according to claim 1, wherein the probability factor is obtained according to a notification of the system broadcast.

3. The method according to claim 1, wherein when the random access resource is selected according to a type of a pre-sent service, selecting, by the UE, a random access resource from the first random access resource and the second random access resource according to a random access rule and the configuration information of the random access resources received from the base station comprises:
    when the pre-sent service is a periodic service, selecting, by the UE, the first random access resource according to the configuration information of the random access resources received from the base station; and
    when the pre-sent service is an emergency service, selecting, by the UE, the second random access resource according to the configuration information of the random access resources received from the base station.

4. The method according to claim 1, wherein when the random access resource is selected according to a type of a pre-sent service, selecting, by the UE, a random access resource from the first random access resource and the second random access resource according to a random access rule and the configuration information of the random access resources received by the base station comprises:
    when the pre-sent service has a requirement for a delay, selecting, by the UE, the first random access resource according to the configuration information of the random access resources received from the base station; and
    when the pre-sent service does not have a requirement for a delay, selecting, by the UE, the second random access resource according to the configuration information of the random access resources received from the base station.

5. The method according to claim 1, wherein when the random access resource is selected according to nearest to a time-frequency resource of the UE, selecting, by the UE, a random access resource from the first random access resource and the second random access resource according to a random access rule and the configuration information of the random access resources received by the base station comprises:
    selecting, by the UE, the random access resource nearest to the time-frequency resource of the UE from the first random access resource and the second random access resource according to the configuration information of the random access resources received from the base station.

6. The method according to claim 1, wherein when the random access is selected according to a type of the UE, selecting, by the UE, a random access resource from the first random access resource and the second random access resource according to a random access rule and the configuration information of the random access resources received from the base station comprises:
    when a priority of the UE is a first priority, selecting, by the UE, the first random access resource according to the configuration information of the random access resources received from the base station; and
    when a priority of the UE is a second priority, selecting, by the UE, the second random access resource according to the configuration information of the random access resources received from the base station.

7. The method according to claim 1, wherein when the random access resource is selected according to an access reason of the UE, selecting, by the UE, a random access resource from the first random access resource and the second random access resource according to a random access rule and the configuration information of the random access resources received from the base station comprises:
when the access reason of the UE is an emergency call, selecting, by the UE, the first random access resource according to the configuration information of the random access resources received from the base station; and
when the access reason of the UE is a normal call, selecting, by the UE, the second random access resource according to the configuration information of the random access resources received from the base station.

8. A terminal (UE), comprising:
at least one processor; and
a memory storing processor-executable instructions that when executed cause the at least one processor to:
receive configuration information of random access resources from a base station, wherein the configuration information of the random access resources comprises: configuration information of a first random access resource received from the base station by using a system broadcast and configuration information of a second random access resource received from the base station by using downlink control information (DCI);
select a random access resource from the first random access resource and the second random access resource according to a random access rule and the configuration information of the random access resources received from the base station;
initiate random access according to the selected random access resource;
perform at least one of: randomly select the random access resource, select the random access resource according to a type of a pre-sent service, select the random access resource nearest to a time-frequency resource of the UE, select the random access resource according to a type of the UE, or select the random access resource according to an access reason of the UE,
wherein when randomly selecting the random access resource, the processor is configured to:
generate a random number; and
select the random access resource according to the random number, a probability factor, and the configuration information of the random access resources received from the base station, wherein:
when the random number is greater than the probability factor, select the first random access resource according to the configuration information of the random access resources received from the base station; and
when the random number is not greater than the probability factor, select the second random access resource according to the configuration information of the random access resources received from the base station.

9. The UE according to claim 8, wherein the probability factor is obtained according to a notification of the system broadcast.

10. The UE according to claim 8, wherein the processor is configured to:
when the pre-sent service is a periodic service, select the first random access resource according to the configuration information of the random access resources received from the base station; and
when the pre-sent service is an emergency service, select the second random access resource according to the configuration information of the random access resources received from the base station.

11. The UE according to claim 8 wherein the processor is configured to:
when the pre-sent service has a requirement for a delay, select the first random access resource according to the configuration information of the random access resources received from the base station; and
when the pre-sent service does not have a requirement for a delay, select the second random access resource according to the configuration information of the random access resources received from the base station.

12. The UE according to claim 8, wherein the processor is configured to:
select the random access resource nearest to the time-frequency resource of the UE from the first random access resource and the second random access resource according to the configuration information of the random access resources received from the base station.

13. The UE according to claim 8, wherein the processor is configured to:
when a priority of the UE is a first priority, select the first random access resource according to the configuration information of the random access resources received from the base station; and
when a priority of the UE is a second priority, select the second random access resource according to the configuration information of the random access resources received from the base station.

14. The UE according to claim 8, wherein the processor is configured to:
when the access reason of the UE is an emergency call, select the first random access resource according to the configuration information of the random access resources received from the base station; and
when the access reason of the UE is a normal call, select the second random access resource according to the configuration information of the random access resources received from the base station.

* * * * *